United States Patent [19]

Saykowski et al.

[11] Patent Number: 4,585,849

[45] Date of Patent: Apr. 29, 1986

[54] RTV SILICONE PASTES

[75] Inventors: Franz Saykowski, Cologne; Thomas Würminghausen, Leverkusen; Hans Stattlegger, Odenthal; Theo Achtenberg, Leverkusen, all of Fed. Rep. of Germany

[73] Assignee: Bayer Aktiengesellschaft, Leverkusen, Fed. Rep. of Germany

[21] Appl. No.: 654,996

[22] Filed: Sep. 26, 1984

[30] Foreign Application Priority Data

Oct. 5, 1983 [DE] Fed. Rep. of Germany ....... 3336135

[51] Int. Cl.$^4$ .............................................. C08G 77/06
[52] U.S. Cl. ...................................... 528/17; 528/18; 528/34; 528/901; 528/38; 524/860; 524/588
[58] Field of Search ................... 528/17, 18, 34, 901, 528/38; 524/860, 588

[56] References Cited

U.S. PATENT DOCUMENTS

| | | | |
|---|---|---|---|
| 3,674,738 | 7/1972 | Nitzsche et al. | 528/34 |
| 3,758,441 | 9/1973 | Nitzsche et al. | 528/34 |
| 4,460,761 | 7/1984 | Schiller | 528/18 |

Primary Examiner—Melvyn I. Marquis
Attorney, Agent, or Firm—Sprung Horn Kramer & Woods

[57] ABSTRACT

In a polydiorganosilixane composition which is capable of storage in the absence of moisture and can be cured at ambient temperature under the action of water or moisture to give elastomers, the composition comprising a diorganosiloxane having reactive terminal groups, a diorganosilane having groups which are sensitive to hydrolysis, a cross-linking agent, and optionally fillers which have a thixotropic effect, condensation catalysts and/or other known auxiliaries, the improvement which comprises employing as the silane (a) a silane of the formula $$RR^1Si(NR^2R^3)_2$$

plus (b) an organosilane of the formula $$RSi(O-N=R^4)_3$$

in which

R, $R^1$, $R^2$ and $R^3$ each independently is alkyl, aryl, aralkyl and vinyl groups, or $R^2$ and $R^3$ together can be an alkanediyl radical having up to 8 C atoms or hydrogen, and $R^4$ is an $R^2R^3C$ group having up to 8 C atoms. The composition cures at room temperature in the presence of moisture to elastomers of desirable physical properties.

12 Claims, No Drawings

RTV SILICONE PASTES

The present invention relates to single-component silicone pastes which undergo vulcanization at room temperature in the presence of water or of atmospheric water vapor (single-component RTV silicone pastes). Materials of this type have long been known per se, and consist of an OH-terminated polysiloxane, a trimethylsiloxy-terminated polysiloxane, fillers, such as, for example, chalk, silicas, etc., silanes having more than two groups sensitive to hydrolysis, and, if appropriate, catalysts and further additives for imparting particular properties.

In order to obtain elastomers which exhibit good adhesion to various joint substrates under high stress, materials have been proposed which, after vulcanization, possess a low modulus of elasticity, so that the load on the contact surfaces is removed, and at the same time have a high elongation at break. This was achieved by using difunctional silanes, so-called chain-lengthening agents.

Thus, systems based on hydroxylamine chain-lengthening agents and crosslinking agents (U.S. Pat. No. 3,341,486), acetamide chain-lengthening agents and crosslinking agents (U.S. Pat. No. 3,766,127), acetamide chain-lengthening agents and amine crosslinking agents (U.S. Pat. No. 3,766,128), acetamide chain-lengthening agents and hydroxylamine cross-linking agents (U.S. Pat. No. 3,817,909) and hydroxylamine chain-lengthening agents with various trifunctional cross-linking silanes (EP No. 0,036,262) have been developed.

Another possibility of improving the properties of existing systems is to use mixed-functional crosslinking silanes or mixtures of different crosslinking agents. Thus, for example, systems based on a triamino-functional crosslinking silane were improved in respect of shelf life and adhesion by the use of a silane possessing amine and oximino functional groups or of a mixture of a crosslinking silane possessing triamino functional groups with one possessing trioxime functional groups (German Auslegeschrift No. 1,941,285).

However, all of the stated systems also possess certain disadvantages. Thus, problems with the shelf life arise in the case of the hydroxylamine systems, or in the case of the diamidosilanes it is necessary to use the relatively expensive corresponding methylvinylsilanes, and EP No. 0,036,262 likewise describes relatively expensive silanes possessing, for example, vinyl and phenyl groups.

It is therefore the object of the present invention to develop a paste which is based on economical conventional silanes and which, after vulcanization, gives silicone rubber materials which have a high elongation at break while containing a high proportion of fillers and exhibiting a low modulus.

Surprisingly, this is achieved with silanes (chain-lengthening agents and crosslinking agents) which are in themselves known, by using, in a suitable manner, $RR^1Si(NR^2R^3)_2$ as the difunctional silane and $RSi(O-N=R^4)_3$ as the trifunctional silane, the partial hydrolysis products of the two silanes, which products are also formed during the preparation, being correspondingly active.

The present invention therefore relates to polydiorganosiloxane compositions which are capable of storage in the absence of moisture, can be cured at ambient temperature under the action of water or moisture to give elastomers, and are obtainable by mixing polydiorganosiloxanes having reactive terminal groups, diorganosilanes having Si-N groups which are sensitive to hydrolysis, of the general formula $$RR^1Si(NR^2R^3)_2$$

wherein $R$, $R^1$, $R^2$ and $R^3$ each independently can be alkyl, aryl, aralkyl and vinyl groups, or $R^2$ and $R^3$ together can be an alkanediyl radical having up to 8 C atoms or hydrogen ($R$ and $R^1$ are preferably methyl groups, and $R^2$ and $R^3$ are alkyl or cycloalkyl groups and/or hydrogen), alkylsilanes of the general formula $$RSi(O-N=R^4)_3$$

wherein $R^4$ is an $R^2R^3C$ group having preferably up to 8 C-atoms and $R^2$ and $R^3$ have the meaning given, fillers which have a thixotropic effect, condensation catalysts and other known auxiliaries.

The invention relates to pastes which are obtained by mixing 100 parts by weight of $\alpha$, $\omega$-dihydroxypolydiorganosiloxane having a viscosity of 100 to 500,000 mPa.s at 25° C., 0–100 parts by weight of $\alpha$, $\omega$-bis-(trialkylsiloxy)-polydiorganosiloxane having a viscosity of 100 mPa.s to 10,000 mPa.s at 25° C., 3–15 parts by weight of diorganodiaminosilane, 6–30 parts by weight of organotrioximesilane and up to 400 parts by weight of a filler, which optionally has a thixotropic effect, and a catalyst.

Because they are readily available, polydimethylsiloxanes are preferably used as the $\alpha$, $\omega$-dihydroxypolydiorganosiloxanes. Instead of the polymers containing methyl groups, it is also possible to use those in which at least some of the methyl groups are replaced with vinyl, phenyl, relatively long-chain alkyl or haloalkyl groups. These polymers should be essentially linear, but small amounts of organosiloxy units can be present. It is also possible to use mixtures of polymers having different viscosities or (block) copolymers of organopolysiloxanes.

The hydroxyl groups of the polymers can be replaced with other terminal groups which can be split off by hydrolysis, such as, for example, with amino or oxime groups.

The viscosity of the polymer is preferably between 5,000 mPa.s (in order to achieve good mechanical properties) and 100,000 mPa.s (in order to ensure that the material, which otherwise is too viscous, is easy to handle). The second mentioned component of the pastes according to the invention is a polydiorganosiloxane which is terminated by trimethylsiloxy groups and whose organo groups are normally methyl groups although at least some of the organo groups can also be vinyl or phenyl groups. In this polymer too, amounts of organosiloxy groups can be present instead of the diorganosiloxy groups.

As the difunctional silane which is unstable to hydrolysis it is preferable to use a dimethyldiaminosilane in which the amine can be a primary or secondary amine with alkyl and/or aryl or aralkyl groups. However, cyclohexylamine or butylamine is preferably chosen. Also methylethyl- or methylpropylsilanes may be added with advantage.

The amount of the difunctional silane which is added to the paste mixture, and the method of mixing the components, determine the properties of the vulcanized materials, as will become clear in the examples.

In these pastes, oximesilanes of the type $$RSi(O-N=R^4)_3$$

wherein

R$^4$ is an R$^2$R$^3$—C group having preferably up to 8 C atoms and

R$^2$ and R$^3$ have the meaning given above, have a crosslinking action. Methyltris-(2-butanone-oxime)-silane is particularly preferably used. Regarding the effect on the properties, the statements made in connection with the chain-lengthening agent are valid.

Furthermore, it is essential to use at least one filler with some thixotropic effect which gives a firm paste when mixed in, this normally being desirable. When the paste is used as a joint-sealing material in vertical or horizontal joints which are open underneath, this thixotropic effect is absolutely essential in order to prevent the paste from flowing out before vulcanization. In connection with the pastes according to the invention, commercially available, optionally surface-treated chalk or dolomite having a mean particle size of less than 3 μm are used for this purpose. This does not exclude the concomitant use of other fillers.

Furthermore, it is also possible to use, in the pastes according to the invention, condensation catalysts as customarily described for single-component RTV silicone pastes, such as metal salts of organic acids, for example dibutyl-tin diacetate or -laurate or titanium compounds. These condensation catalysts are incorporated into the paste in amounts or 0.01 to 5 percent by weight. Optionally, also organic solvents, oligomers or polymers —if necessary in presence of an emulsifying agent—may be admixed. Examples are paraffines, polyethers, polyesters, polyamide, polyacrylate or polymerizing products of olefins and acetylen.

The examples which follow are intended to illustrate the subject of the present invention in more detail.

In the examples, the viscosity data relate to 25° C., the amounts used are parts by weight or % by weight, the Shore A values are determined in accordance with DIN 53 505, and the modulus of elasticity, the tensile strength and the elongation at break are determined in accordance with DIN 53 504. The commercially available chalk used has a mean particle size of less than 1 μm, the dolomite has a mean particle size of less than 3 μm. The preparation of the pastes is carried out under essentially anhydrous conditions in planetary mixers under vacuum, but can be carried out in other customarily used machines.

EXAMPLE 1

30 parts of α, ω-dihydroxypolydimethylsiloxane having a viscosity of 50,000 mPa.s and 12 parts of α, ω-bis-(trimethylsiloxy)-polydimethylsiloxane having a viscosity of 1,000 mPa.s are mixed with 2.5 parts of dimethyl-bis-(cyclohexylamino)-silane in vacuo for 10 minutes. Thereafter, 45 parts of chalk which have been precipitated, and treated with stearic acid, are intensively mixed in over 15 minutes, after which 8 parts of α, ω-bis-(trimethylsiloxy)-polydimethylsiloxane having a viscosity of 1,000 mPa.s, 6 parts of methyltris-(2-butanone-oxime)-silane and 0.3 part of dibutyl-tin dilaurate are added. After the mixture has been stirred for about 45 minutes, a homogeneous paste is obtained. After the vulcanization, the following values are obtained:

| Shore A | 6 |
|---|---|
| Modulus of elasticity, 100% | 0.12 [MPa] |
| Tensile strength | 0.64 [MPa] |
| Elongation at break | 770 [%] |

EXAMPLE 2

A paste containing only 2 parts of dimethyl-bis-(cyclohexylamino)-silane is prepared analogously to Example 1. The paste vulcanizes under the action of atmospheric moisture to give a silicone rubber having the following mechanical properties:

| Shore A | 7 |
|---|---|
| Modulus of elasticity, 100% | 0.13 [MPa] |
| Tensile strength | 0.63 [MPa] |
| Elongation at break | 720 [%] |

EXAMPLE 3

30 parts of α, ω-dihydroxypolydimethylsiloxane having a viscosity of 50,000 mPa.s and 20 parts of α, ω-bis-(trimethylsiloxy)-polydimethylsiloxane having a viscosity of 1,000 mPa.s are stirred with 2.5 parts of dimethyl-bis-(cyclohexylamino)-silane in vacuo for 10 minutes. Thereafter, 45 parts of chalk which has been precipitated, and treated with stearic acid, are mixed in intensively over 15 minutes, after which 6 parts of methyltris-(2-butanone-oxime)-silane and 0.1 part of dibutyl-tin dilaurate are added. After the mixture has been stirred for about 45 minutes, a homogeneous paste is obtained. After crosslinking, the following values are measured:

| Shore A | 9 |
|---|---|
| Modulus of elasticity, 100% | 0.13 [MPa] |
| Tensile strength | 0.79 [MPa] |
| Elongation at break | 950 [%] |

EXAMPLE 4

30 parts of α, ω-dihydroxypolydimethylsiloxane having a viscosity of 50,000 mPa.s and 12 parts of α, ω-bis-(trimethylsiloxy)-polydimethylsiloxane having a viscosity of 1,000 mPa.s are stirred with 2.0 parts of dimethylbis-(i-butylamino)-silane in vacuo for 10 minutes. Thereafter, 45 parts of chalk which has been precipitated, and treated with stearic acid, are mixed in intensively over 45 minutes, after which 8 parts of α, ω-bis-(trimethylsiloxy)-polydimethylsiloxane having a viscosity of 1,000 mPa.s, 4.5 parts of methyltris-(2-butanone-oxime)-silane and 0.1 part of dibutyl-tin dilaurate are added. After the mixture has been stirred for about 45 minutes, a homogeneous paste is obtained; after crosslinking, the following mechanical values are measured on an appropriate sample:

| Shore A | 7 |
|---|---|
| Modulus of elasticity, 100% | 0.09 [MPa] |
| Tensile strength | 0.81 [MPa] |
| Elongation at break | 1030 [%] |

EXAMPLE 5

To a mixture of 19.2 parts by weight of α, ω-dihydroxypolydimethylsiloxane (viscosity 50,000 mPa.s) and of 12.8 parts by weight of α, ω-bis-trimethylsiloxypolydimethylsiloxane (viscosity 1,000 mPa.s) 63.5 parts by weight of milled dolomite (average grain diameter 2 μm) were added. Thereafter, 1.3 parts of dimethylbis-(cyclohexylamino)-silane were added and under vacuo for a period of 15 minutes mixed. Then 2.9 parts of methyl-tris-(2-butanonoxime)-silane and 0.06 parts dibutyl-tin diacetate were added and the resulting mixture is stirred for 10 minutes under vacuo. The resulting paste hardened at moist air into a rubber material. After 7 days following properties could be determined:

| Shore A | 20 |
|---|---|
| Modulus of elasticity, 100% | 0.34 [MPa] |
| Tensile strength | 0.68 [MPa] |
| Elongation at break | 500 [%] |

EXAMPLE 6

This Example has been carried out as Example 5 with the proviso, however, that the dolomite had an average grain size (diameter) of 1.8 μm. The resulting elastomer material had following properties:

| Shore A | 16 |
|---|---|
| Modulus of elasticity, 100% | 0.28 [MPa] |
| Tensile strength | 0.68 [MPa] |
| Elongation at break | 500 [%] |

As employed hereinabove and in the claims which follow, alkyl alone or as a part of aralkyl preferably has up to 8 and more preferably up to 6 carbon atoms, and aryl alone or as a part of alkyl is naphthyl or, preferably, phenyl.

It will be appreciated that the instant specification and examples are set forth by way of illustration and not limitation, and that various modifications and changes may be made without departing from the spirit and scope of the present invention.

We claim:

1. In a polydiorganosiloxane composition which is capable of storage in the absence of moisture and can be cured at ambient temperature under the action of water or moisture to give elastomers, the composition comprising a diorganosiloxane having reactive terminal groups, a diorganosilane having groups which are sensitive to hydrolysis, a cross-linking agent, and optionally fillers which have a thixotropic effect, and condensation catalysts, the improvement which comprises employing as the silane (a) a silane of the formula $$RR^1Si(NR^2R^3)_2$$

plus (b) an organosilane of the formula $$RSi(O-N=R^4)_3$$

in which

R, $R^1$, $R^2$ and $R^3$ each independently is alkyl, aryl, aralkyl and vinyl groups, or $R^2$ and $R^3$ can be H or together can be an divalent alkyl radical radical having up to 8 C atoms, and $R^4$ is an $R^2R^3$—C group having up to 8 C atoms.

2. A composition according to claim 1, in which R and $R^1$ are methyl groups.

3. A composition according to claim 1, in which the group ($NR^2R^3$) is a cyclohexylamino radical or a butylamino radical.

4. A composition according to claim 1 in which the organosilane (b) is methyltris-(2-butanone-oxime)-silane.

5. A composition according to claim 1, comprising by weight 100 parts of α, ω-dihydroxypolydiorganosiloxane having a viscosity of 100 to 500,000 mPa.s, 3–15 parts of a dimethyldiaminosilane, 6–30 parts of an organotrioximesilane, 0 to 400 parts of a filler, 0.01–5.0 parts of a condensation catalyst, and 0 to 100 parts by weight of α, ω-bis-(trialkylsiloxy)-polydiorganosiloxane having a viscosity of 100 to 10,000 mPa.s.

6. A composition according to claim 5, wherein the α, ω-dihydroxypolydiorganosiloxane is an α, ω-dihydroxypolydimethylsiloxane.

7. A composition according to claim 5, wherein the organotrioximesilane is a methyltrioximesilane.

8. A composition according to claim 5, wherein the α, ω-bis-(trialkylsiloxy)-polydiorganosiloxane is an α, ω-bis-(trimethylsiloxy)-polydimethylsiloxane.

9. A composition according to claim 5, wherein the filler is optionally surface-treated chalk or dolomite having a mean particle size of less than 3 μm.

10. A composition according to claim 5, wherein the condensation catalyst is a metal salt of an organic acid.

11. A composition according to claim 1, wherein the reactive terminal groups of the polydiorganosiloxane are amino and/or oxime groups.

12. An elastomer produced by curing a composition according to claim 1.

* * * * *